(12) United States Patent  (10) Patent No.: US 7,569,093 B2
Pranda et al.  (45) Date of Patent: Aug. 4, 2009

(54) FILTERING PARTICULATE MATERIALS IN CONTINUOUS EMISSION MONITORING SYSTEMS

(75) Inventors: Pavol Pranda, Lisle, IL (US); William A. Von Drasek, Oak Forest, IL (US); Kenneth A. Mulderink, Countryside, IL (US)

(73) Assignee: American Air Liquide, Inc., Fremont, CA (US)

( * ) Notice: Subject to any disclaimer, the term of this patent is extended or adjusted under 35 U.S.C. 154(b) by 515 days.

(21) Appl. No.: 11/394,208

(22) Filed: Mar. 31, 2006

(65) Prior Publication Data

US 2006/0249023 A1    Nov. 9, 2006

Related U.S. Application Data

(60) Provisional application No. 60/677,643, filed on May 4, 2005.

(51) Int. Cl.
*B01D 46/00* (2006.01)
(52) U.S. Cl. .............................. 95/23; 95/279; 95/286; 96/413; 73/863.23; 73/863.25; 73/863.31; 73/863.24; 55/523; 55/302
(58) Field of Classification Search ............. 73/863.23, 73/863.25, 863.31, 863.13; 55/302, 350.1, 55/495, 523; 95/278, 23, 279, 286, 273; 96/413

See application file for complete search history.

(56) References Cited

U.S. PATENT DOCUMENTS

| | | | | | |
|---|---|---|---|---|---|
| 4,090,392 | A | * | 5/1978 | Smith et al. | ............... 73/863.23 |
| 4,341,124 | A | * | 7/1982 | Rodgers et al. | ........... 73/863.01 |
| 4,894,074 | A | * | 1/1990 | Mizrah et al. | ................. 55/482 |
| 4,912,985 | A | * | 4/1990 | Daum et al. | .............. 73/863.25 |
| 5,417,728 | A | * | 5/1995 | Royle | ........................... 55/302 |
| 2004/0261375 | A1 | * | 12/2004 | Scheuch | ...................... 55/302 |

* cited by examiner

*Primary Examiner*—Duane Smith
*Assistant Examiner*—Dung Bui
(74) *Attorney, Agent, or Firm*—Christopher J. Cronin; Patricia E. McQueeney

(57) ABSTRACT

A filtering system for monitoring fluid emissions from a process includes a plurality of filter assembly sections arranged in a parallel fluid flow manner with respect to each other so as to selectively receive a sample fluid (e.g., a sample gas) entering at an inlet of the system. Each filter assembly section includes a filter unit to filter particulate materials from a fluid flowing through the filter, first and second valves disposed at upstream and downstream locations of the filter unit, and a blowback flow path configured to selectively direct a cleaning fluid through the filter unit in a direction that opposes a direction in which the sample fluid flows through the filter unit. Each filter assembly section can be selectively isolated from other portions of the system so as to prevent the sample fluid from flowing through the filter assembly section while allowing a cleaning fluid to be delivered through the blowback flow path of the filter assembly section.

11 Claims, 2 Drawing Sheets

FILTERING PARTICULATE MATERIALS IN CONTINUOUS EMISSION MONITORING SYSTEMS

CROSS-REFERENCE TO RELATED APPLICATIONS

This application claims priority from U.S. Provisional Patent Application Ser. No. 60/677,643, entitled "Method and Apparatus for Filtering Particulate Matter on Continuous Emission Monitoring Systems," and filed May 4, 2005. The disclosure of this provisional patent application is incorporated herein by reference in its entirety.

BACKGROUND

1. Field

The disclosure pertains to extractive sampling in continuous emission monitoring systems and, in particular, filtration of the extracted samples in such emission monitoring systems.

2. Related Art

Extractive sampling systems are typically used for continuously monitoring emissions of off-gases for combustion processes such as, for example, electric arc furnaces (EAF), rotary furnaces, and waste incinerators. In the extractive sampling systems, the extracted sample is often conditioned or treated before analysis. For example, for conventional analyzers, the extracted sample must first be conditioned by removing particulate materials of certain sizes via filtration and by separating water vapor from the gaseous stream (e.g., via a condenser, chiller and/or membrane) prior to being delivered to the analyzer.

An extracted gas sample measurement is conducted by inserting a probe into the process environment at a monitoring or measuring point of interest. Depending upon the process conditions (e.g., high temperature conditions), the probe can be water or gas cooled prior to and/or during insertion or, alternatively, the probe can be constructed of a high temperature resistant material. The extracted gas sample is transported through a sampling line to a particle filter and then to a water/gas separation system. When conditioning of the gas is complete, analysis of the conditioned gas is performed using conventional techniques such as non-dispersive infrared (NDIR) detectors for analysis of CO, $CO_2$ and $NO_x$, paramagnetic resonance detectors for analysis of $O_2$, and thermal conductivity detectors for analysis of $H_2$.

Extractive sampling of high density processes (e.g., EAF, glass melters, aluminum furnaces, etc.) often require periodic maintenance due to restriction or plugging that can occur within the sampling line, particularly at the filters, which in turn reduces or completely restricts the flow of gases to the analyzer.

Filter plugging can be overcome by utilizing a purge or "blowback" technique in which a high-pressure gas is blown through the sampling line and filter in the opposite direction as the gas-sample stream that is provided to the analyzer. Depending upon the particulate material characteristics in a gaseous sample stream for a particular process, the frequency of blowback or purging that is required can range from about every 15 minutes to about every 8 hours or more, with the blowback process requiring a duration of about 5-10 seconds or more.

During a blowback step, any other gas conditioning devices (e.g., condensers or chillers) as well as the analyzer must be isolated from the high-pressure gas to prevent damage to such devices. The blowback process further interrupts the continuous gas monitoring process, which can become frequent for high density sample gases which require a shorter time interval between blowback steps to prevent clogging of the sample line. In addition, after the blowback process, the sampled process gas in the sample line can become diluted for a time period that is controlled by the size or volume of the sampling line and the sampling rate. For example, a high volume sampling line with a low sample rate will require more time for the blowback gas to be removed from the sampling line so that the actual process gas can be processed by the analyzer.

Interruptions and delays in the sample gas measurements by the analyzer (or analyzers), as well as the above-noted dilutions of the sample gas that can occur, due to blowback processing can become problematic particularly for dynamic processes that require continuous and real-time monitoring. In addition, for sampling streams containing a high density of particulate materials, other potential problems in the sampling process are possible. In particular, when the filter starts to collect and build up particles during gas sampling, the pressure differential within the sampling line will increase and the sampling flow rate will decrease. This results in sampling rate variations as well as delays in sampling measurements, which can be detrimental to the sampling process.

For example, in a dynamic process such as an EAF batch mode process, the particulate material density in the sampling stream can be as high as 150 $g/Nm^3$. The EAF process requires continuous off-gas monitoring to control $O_2$ injection into the EAF, which improves energy efficiency. In the EAF process, filter blowback can occur during charging cycles every 30-60 minutes without interrupting the process measurement. However, the particle density of this process is so high that sampling rate variations caused by pressure drop variations across the filter are very likely to occur between blowback processing steps. When the sampling measurements are coupled to a process control scheme for $O_2$ injection, the variation in sampling can result in undershooting or overshooting the desired $O_2$ concentration in the EAF, which in turn reduces the potential for energy recovery through $CO/H_2$ combustion in the process.

SUMMARY

An efficient system and corresponding method are provided to avoid the above-noted problems associated with continuous emissions monitoring caused by filter clogging and requisite blowback procedures. In particular, system and method facilitate effective blowback of a sample line while maintaining a substantially continuous flow of sample to an analyzer section downstream from the sampling line.

A filtering system for monitoring fluid emissions from a process comprises a plurality of filter assembly sections arranged in a parallel fluid flow manner with respect to each other so as to selectively receive a sample fluid (e.g., a sample gas) entering at an inlet of the system. Each filter assembly section comprises a filter unit to filter particulate materials from a fluid flowing through the filter, first and second valves disposed at upstream and downstream locations of the filter unit, and a blowback flow path configured to selectively direct a filter cleaning fluid through the filter unit in a direction that opposes a direction in which the sample fluid flows through the filter unit. The first and second valves of each filter assembly section are operable to selectively isolate the filter assembly section from other portions of the system so as to prevent the sample fluid from flowing through the filter assembly section while allowing the filter cleaning fluid to be delivered through the blowback flow path of the filter assembly section.

The system further includes an analyzer section disposed downstream from the filter assembly sections to received filtered sample fluid for analysis of species within the sample fluid.

In accordance with another embodiment, a method of monitoring fluid emissions from processing equipment comprises extracting a sample fluid from the processing equipment, and delivering the sample fluid to a filter assembly comprising a plurality of filter assembly sections arranged in a parallel fluid flow manner with respect to each other, where each filter assembly section includes a filter unit and first and second valves disposed at upstream and downstream locations of the filter unit to isolate each filter assembly section from other portions of the filter assembly.

The flow of the sample fluid is selectively controlled through at least a first filter assembly section by opening the first and second valves of the first filter assembly section while being prevented from flowing through at least a second filter assembly section by maintaining the first and second valves of the second filter assembly section in a closed position. The filter unit of the first filter assembly section filters particulate materials from the sample fluid flowing through the first filter assembly section. The method further comprises delivering the filtered sample fluid from the filter assembly to an analyzer section that includes at least one analyzer to determiner the concentration of at least one species within the filtered sample fluid.

The above and still further features and advantages will become apparent upon consideration of the following detailed description of specific embodiments thereof, particularly when taken in conjunction with the accompanying drawings.

DETAILED DESCRIPTION

An extractive sampling system for continuously monitoring gaseous and/or other types of fluid emissions (e.g., liquids) from an application or process includes a main sampling line with a plurality of separate conditioning lines connected in parallel or a multiplexed manner to the main sampling line, where each conditioning line includes a filter to remove particulate materials from a sampled gas stream flowing through the conditioning line.

The conditioning lines can include any one or more suitable types of filters for filtering particulate materials of selected sizes from the gaseous sample. The filter material can be of any suitable type, such as sintered metal or ceramic materials. The pore size of the filter material can also be of any selected size, such as in the range of about 5 micrometers (microns) to about 50 microns depending upon a particular application. The filter material can also include smaller pore sizes (e.g., 1-2 microns or less) for a particular application. The filter configuration can also be of any suitable type. Examples of filter configurations that are suitable in extractive sampling systems are porous disks of a selected thickness through which the sample fluid flows and/or hollow filters (e.g., cylindrical filters).

Figure 1:
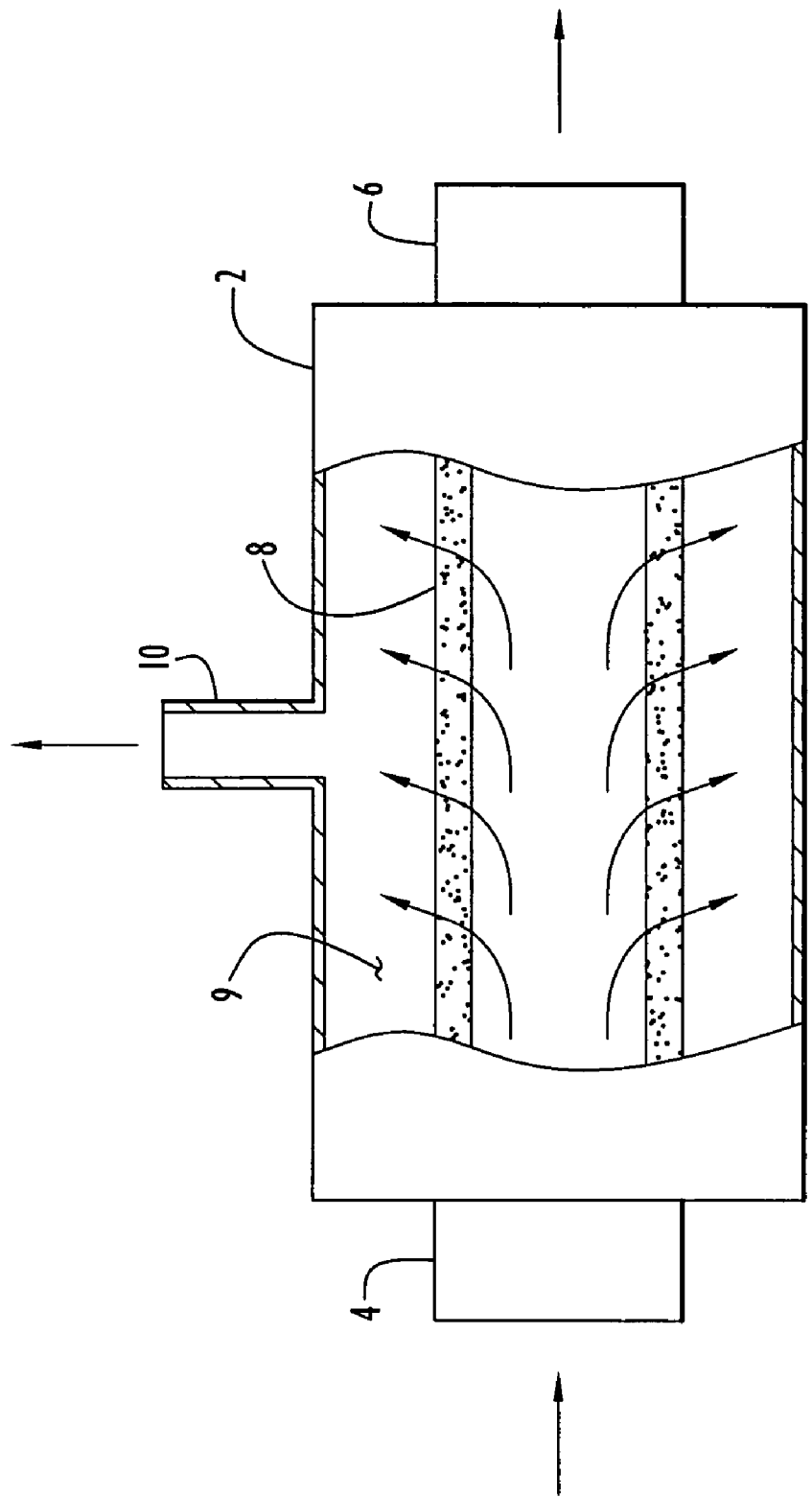
FIG. 1 is a cross-sectional side view of an exemplary embodiment of an inertial filter that can be used in continuous emission sampling lines.

An exemplary embodiment of a hollow filter that can be used is an inertial filter with a configuration as depicted in FIG. 1. In particular, the inertial filter of FIG. 1 includes an outer housing 2 with an inlet 4 that connects with the sampling line at a location downstream from the application or process from which gaseous samples are extracted, and an outlet 6 that processes unused gas flowing from the housing (e.g., delivers the gas to a vent or other processing site). Disposed within the housing is a hollow and generally cylindrical filter 8 that is in fluid communication with the housing inlet and outlet. The cylindrical filter can be, e.g., a sintered metal tube. The cylindrical filter is further suitably dimensioned to fit within housing 2 so as to define an annular gap 9 between the interior wall portions of the housing and exterior wall portions of the filter. An extraction line 10 connects at a suitable location (e.g., a central location) along housing 2 and extends transversely from the housing to connect with an analyzer section that includes one or more analyzers.

When a gaseous sample flows through housing 2 and into filter 8, a selected portion of the gas is extracted into extraction line 10 (e.g., by providing a vacuum within line 10), where the gas first is filtered as it passes through the wall portions of filter 8 and into annular gap 9 before it is drawn into extraction line 10. Thus, a selected volume of gas is withdrawn radially through filter 8, while the remainder of gas flows through the filter and the housing to the housing outlet. In this configuration, and depending upon the pressure differentials applied between the housing inlet and housing outlet as well as the extraction line, the larger particulate materials tend to follow the main flow path through the housing, while smaller particles can flow with the radially extracted gas and are filtered as the gas passes through the filter wall portions.

An elongated hollow filter such as the inertial filter depicted in FIG. 1 provides a larger filter surface area for a sample gas stream and is thus preferable in comparison to the more limited surface area provided by, e.g., a filter disk. However, the system described herein is not limited to an elongated hollow filter or a disk filter, such as the types described above, but rather can include any one or more suitable types of filters as may be required for a particular application and that are capable of being used with a blowback process.

Figure 2:
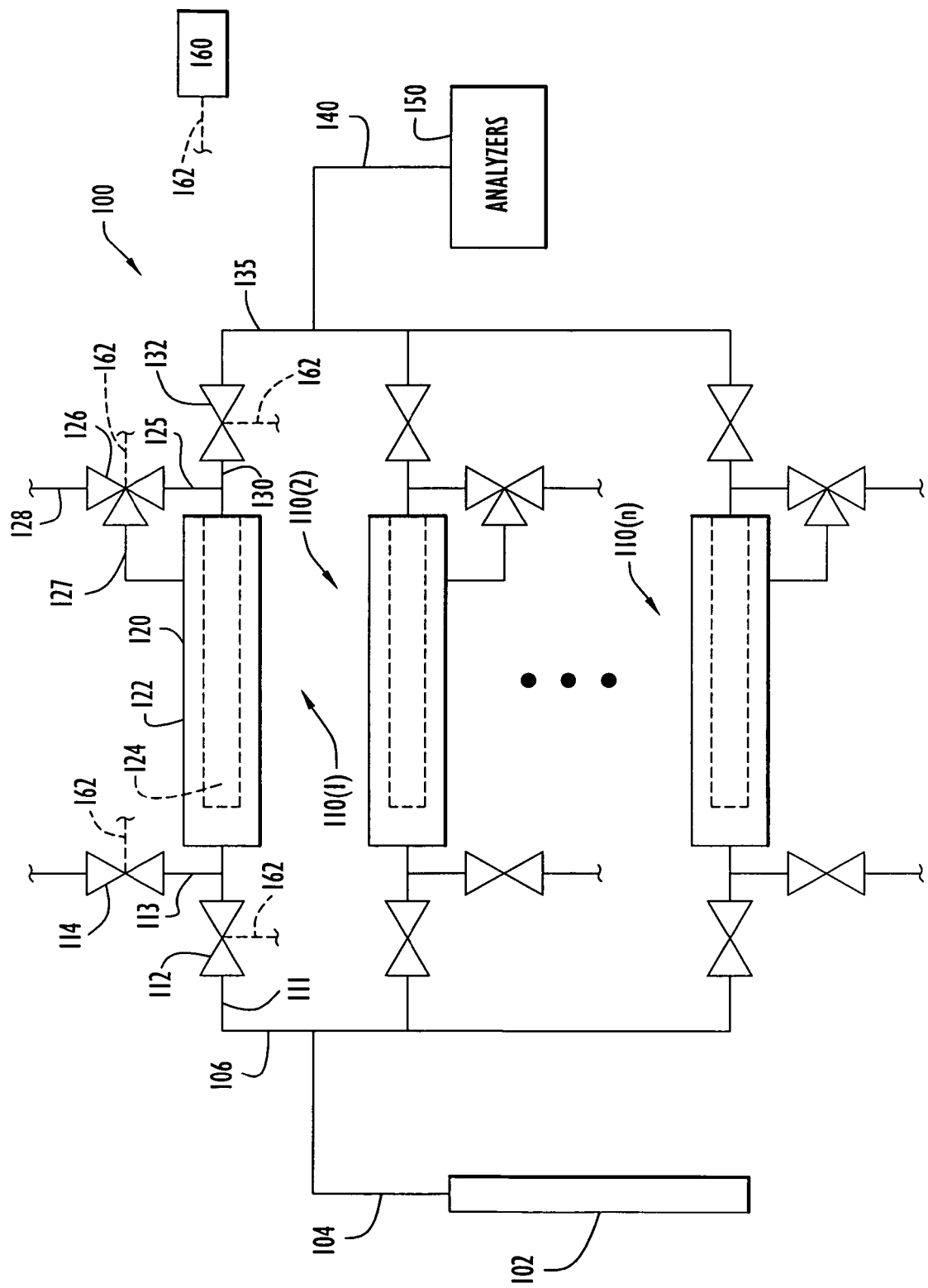
FIG. 2 is a schematic of an exemplary embodiment of a sampling system for use in continuous emissions monitoring of a device.

An exemplary embodiment of a system that filters particulate materials from extracted samples of a particular application is depicted in FIG. 2. The system can be used in combination with any continuous emission monitoring system for a wide variety of applications including, without limitation, electric arc furnaces (EAF), glass melting furnaces, aluminum furnaces, rotary furnaces, and waste incinerators. In particular, the system of FIG. 1 is highly effective for use in EAF post combustion off-gas monitoring systems such as the types commercially available under the trademark ALARC from Air Liquide America Corporation (Houston, Tex.). The system is further capable of providing the extracted sample gas to any one or combination of other gas conditioning devices (e.g., condensers, chillers and/or other devices for separating water and/or other components from the sample gas) and also any one or combination of analyzers including, without limitation, non-dispersive infrared (NDIR) detectors for analysis of CO, $CO_2$ and $NO_x$, paramagnetic resonance detectors for analysis of $O_2$, and thermal conductivity detectors for analysis of $H_2$.

Referring to FIG. 2, system 100 includes a sampling probe 102 that is inserted within a vent or outlet of a vessel or other process equipment (e.g., an EAF) from which a gas is to be sampled for a particular application. The sampling probe can be of any suitable type and is preferably configured for use as a probe in extracting gases from high temperature environments such as furnaces. Exemplary embodiments of a sampling probe that is suitable for use in the system include, without limitation, a water or air cooled device, or a device constructed of a suitable temperature resistant material that is capable of operating in temperature environments in the range up to about 1500° C.

A sample line 104 is connected between probe 102 connects and a multiplexing or manifold section 106. The manifold section includes a plurality of branch lines 111 that are connected to a plurality of filter assembly sections 110(1) through 110(n). In particular, each filter assembly section is connected to the manifold section via a single branch line 111, such that the filter assembly sections are isolated from and are arranged in a parallel fluid flow arrangement with respect to each other. As described in detail below, the manifold section is operable to facilitate fluid flow through a selected single filter assembly section or, alternatively, through two or more selected filter assembly sections at any time during system operation. Any suitable number (e.g., two or more) of filter assembly sections can be provided in system 100, where the number and types of filter assembly sections will depend upon a particular application.

As can be seen from FIG. 2, each filter assembly section 110(n) has the same configuration and components. However, it is noted that the system is not limited to such configuration. Rather, the system could include different filter assembly sections that are isolated and provided in parallel flow arrangements with each other. For example, different filter assembly sections can be provided with different types of filter configurations and/or filtering materials.

Referring to FIG. 2, each filter assembly section 110(n) includes an inlet valve 112 disposed along a corresponding flow line 111, where valve 112 is manipulated between open and closed positions to permit fluid to flow from sampling line 104 into the particular filter assembly section. Each filter assembly further includes a filter 120 connected inline and downstream from the inlet valve 112, and also a blowback valve 114 disposed along a branch flow line 113 that is disposed between valve 112 and filter 120. The system can be configured such that valves 112 and 114, as well as any other one or more valves provided in the system, are manually and/or automatically operable to open and closed positions. For example, a conventional or any other suitable type of controller can be provided to automatically control the inlet and blowback valves of each of the filter assembly sections during system operation. Each branch flow line 113 for the filter assembly sections can be separate and independent from the others or, alternatively, the branch flow lines can connect to a single line (e.g., via a manifold connection) at a location downstream from the blowback valves 114.

Valves 112 and 114 can be any suitable type of valve that preferably has a high flow rate factor or $C_v$ value, since these valves are exposed to a high density of particles during the blowback phase of operation as described below. A valve with a low $C_v$ value can potentially become clogged and exhibit seal failure when exposed to high particle densities in fluid streams such as in blowback streams from the filter. Exemplary valves that can be utilized for the inlet and blowback valves of the filter assembly sections are ball valves such as, for example ball valves commercially available from Marwin Valve (Cincinnati, Ohio).

A filter 120 is provided in each filter assembly section 110(n). Each filter 120 includes an elongated and hollow outer housing 122 and a hollow and generally cylindrical filter element 124 disposed within the outer housing. The filter element 124 is constructed of a suitable porous material (e.g., sintered metal or ceramic material) and includes a closed or capped first end that is disposed near a first open end of the housing which forms the inlet of the filter. A second open end of filter element 124 extends to a second end of the housing and defines an outlet of the filter.

The filter element is smaller in transverse cross-sectional dimension than the filter housing, such that an annular gap is formed between outer wall portions of the filter element and inner wall portions of the housing. The second housing end is also closed at portions corresponding with the annular gap, such that fluid within the housing must pass through wall portions of the filter element before emerging from the filter outlet. Thus, filter 120 is designed such that fluid flowing within the filter inlet first enters housing 122, flows through filter element 124 (e.g., at the first end and/or at a portion along the annular gap defined between the outer housing and the filter element) and out of the housing outlet.

The filter design described above and depicted in FIG. 2 provides a large filtering surface area along substantially the entire length of filter element 124 and is thus highly effective for filtering fluids with high particle densities, such as fluids extracted in EAF off-gas monitoring systems (e.g., the ALARC systems as noted above). In particular, if a portion of the filter element becomes blocked or clogged with a large amount of particulate materials adhered to the outer surface portion of the filter element, the remaining outer surface area of the filter element is still available for filtering fluid. However, as noted above, any other suitable filter device can be provided to filter particulate material of selected sizes from the extracted gaseous sample fluid.

Each filter assembly section 110(n) further includes an isolation valve 132 disposed along a fluid flow line 130 that is situated downstream from the filter outlet of each filter 120. Each fluid flow line 130 connects with a manifold section 135 located downstream from isolation valve 132, where the manifold section connects each flow line 130 of the filter assembly sections with a single flow line 140.

Disposed between the filter outlet and isolation valve 130 of each filter assembly section 110(n) is a blowback line 125 that leads to a three-way valve 126. Each three-way valve has a general "T" or "Y" shape or configuration and includes three valve ports. A first valve port is connected with a flow line 128, while a second valve port is connected to blowback line 125 and a third valve port is connected via a flow line 127 to housing 122 at a selected location between the filter inlet and outlet so as to be in fluid communication with the annular gap within the housing.

For each filter assembly section, flow line 128 leads to a high pressure fluid supply source that delivers a high pressure fluid during the blowback procedure described below. Optionally, the flow line 128 can also be connected with a vacuum source to generate a vacuum within a filter assembly section 110(n) after the blowback procedure as described below. In such an embodiment, the flow line can be connected in any suitable manner to each of the high pressure fluid supply source and the vacuum source (e.g., via one or more isolation valves that alternate the fluid flow path between the flow line and each of the two sources). Each flow line 128 for the filter assembly sections can be independently connected to a high pressure fluid supply and/or vacuum source(s) or, alternatively, the flow lines 128 can all be connected (e.g., via a manifold connection) to a single line that provides high pressure fluid to and/or generates a vacuum within flow lines 128.

Each valve 126 is manually or automatically manipulable between an open position, where fluid can flow through the valve between the first valve port and each of the second and third valve ports, and a closed position, where fluid is prevented from flowing through the valve between the first valve port and each of the second and third valve ports. Thus, in a blowback procedure for a particular filter assembly section 110(*n*) in which valve 126 is in an open position, fluid from a high pressure fluid supply source can be directed from flow line 128 through the first valve port and into an open valve 126, where the fluid is then directed through the second and third valve ports and into the filter element 124 (via line 125) and into the filter housing 122 (via line 127).

Any one or more suitable gas conditioning devices can be provided along flow line 140 including, without limitation, condensers or chillers for removing water from the sample gas, additional filters having smaller pore sizes for filtering finer particles, etc. In addition, any one or more types of sensors can be provided to measure and monitor certain physical characteristics of the sample gas stream (e.g., temperature, pressure, flow rate, etc.). In particular, the flow rate and/or pressure of the sample gas stream can be monitored within flow line 140 (and/or at other locations within system 100) so as to determine to what extent a filter in any filter assembly section may be clogged or significantly restricting fluid flow at any point in time during system operation.

The flow line 140 further leads to an analyzer section 150. The analyzer section can include any one or more suitable analyzers (e.g., analyzers as described above) for monitoring the presence and/or concentrations of any one or more constituents (e.g., $O_2$, CO, $CO_2$, $NO_x$, etc.) in the sample gas stream.

System 100 can be operated such that sample fluid is allowed to continuously flow through one or more filter assembly sections to the analyzer section. In an exemplary embodiment, filter assembly section 110(1) is selected for operation by opening valves 112 and 132 in section 110(1), while maintaining valves 112 and 132 in each of the other sections 110(2)-110(*n*) in a closed position (thus maintaining isolation of these sections from fluid flow from sample line 104). Valves 114 and 126 in each of the filter assembly sections are also maintained in closed positions. Sample probe 102 is suitably connected with process equipment of an application that is to be continuously monitored so as to permit a sample gas fluid to be continuously extracted from the process for delivery into probe 102 and sample line 104, where the fluid continues to flow through valve 112 and into the inlet of filter 120 of section 110(1).

The flow rate of the sample fluid is monitored and optionally controlled by controlling the fluid pressure within system 100 in any suitable manner (e.g., using additional valves and/or pumps at any one or more suitable locations within the system). The sample fluid is filtered within filter 120 and is then delivered to flow line 140, where it is optionally further conditioned and then directed to the analyzer section 150 for analysis of the sample.

When the accumulation of particulate materials on filter element 124 of the filter of section 110(1) has become significant, resulting in a reduction of the flow rate of sample fluid through the filter assembly section below a desired or threshold level, a blowback cycle or process is initiated. This blowback process can be performed manually or automatically (e.g., via a processor). Alternatively, or in addition to monitoring the sample fluid flow rate, the blowback process can be performed over a selected time interval. In the blowback process, filter assembly section 110(1) is brought offline by closing valves 112 and 132 so as to isolate this section from the sample line and analyzer section. At substantially the same time, another filter assembly section, such as section 110(2), is brought online by opening valves 112 and 132 of this section to facilitate continuous conditioning of the sample fluid as it flows to the analyzer section. Thus, the system permits continuous emission monitoring of the process application while the first filter assembly section is brought offline to clean the filter.

Once filter assembly section 110(1) is isolated from sample line 104 and line 140 (which leads to further conditioning and/or analyzer section 150), valve 126 and valve 114 of section 110(1) are opened with fluid flow line 128 being connected to a high pressure fluid supply source. The high pressure fluid is directed through valve 126 and into flow lines 125 and 127, where the fluid then enters directly into filter element 124 at the filter inlet as well as within housing 122. The high pressure fluid travels through the filter to flow line 113, through valve 114 and out of section 110(1) to another processing site or storage location. The fluid flowing through filter 120 in the blowback process removes particulate materials from the filter element 124 and filter housing 122 and transports such materials away from the filter section and out of system 100 via line 113.

Any one or more suitable high pressure and/or other fluids can be provided including, without limitation, inert purge gases and/or cleaning liquids. The isolation of the filter section from other portions of the system allows for rigorous cleaning of the filter housing and filter element with, e.g., a variety of one or more cleaning liquids (e.g., water, steam, cleaning solvents, etc.) and/or by heating of the filter. When utilizing a cleaning liquid such as water or certain solvents, the filter is preferably also dried with a purge gas prior to being brought back online for re-use in the system.

As noted above, line 128 can also optionally be securable to a vacuum source to facilitate withdrawal of any purge gases and/or other cleaning fluids utilized in the blowback process from filter assembly section 110(1) prior to bringing this section back online for re-use. In such a process, valve 114 of section 110(1) is first closed, followed by applying a vacuum within line 128 to draw fluids from the filter assembly section into line 128 and out of the system. Fluids could also be withdrawn from the filter assembly section by closing valve 126 and then applying a vacuum at line 113 to withdraw the fluids into line 113 and out of the system. Prior to bringing filter assembly section 110(1) back online, valves 114 and 126 are closed. When it is desirable to bring section 110(1) back online, valves 112 and 132 are again opened to facilitate sample fluid flow from sample line 104 through the section and to line 140.

For certain applications, and depending upon the typical particle sizes and particle densities for such applications, sample probe 102 may become plugged or clogged and it may be necessary to remove such particles from the probe. In this situation, the continuous emission monitoring process must be temporarily halted, and the probe is withdrawn from the process. Valves 114 and 132 of the filter assembly section being used are closed (or remain closed), while valves 126 and 112 are open (or remain open). A high pressure fluid is delivered from line 128 through section 110(1) and to probe 102, resulting in particulate materials being removed from the probe and being entrained with the high pressure fluid.

The system is designed with a suitable number of filter assembly sections (e.g., two or more) to facilitate continuous emission monitoring by switching sample fluid flow from one filter assembly section to another when a filter becomes significantly clogged or flow through the filter is severely restricted. The system can be configured such that switching occurs in a consecutive manner along the filter assembly sections, thus providing a sufficient period of time to clean one filter assembly section before it is required to be brought online again. In addition, the system is configured to facilitate the use of two or more filter assembly sections simultaneously for filtering sample fluid during the continuous emission monitoring process. The system is further configured to simultaneously perform the blowback process described above for any two or more filter assembly sections.

In addition, as noted above, the system can be controlled manually or automatically, with blowback procedures being implemented for one or more filter assembly sections based upon measured flow rates and/or pressures within these sections and/or based upon a preset time interval in which the sections are in use. For example, one or more suitable controllers can be implemented in the system to control the valves of the filter assembly sections in order to switch from one filter assembly section to another during system operation while maintaining sample fluid flow through the system.

Referring to FIG. 2, a controller 160 is depicted with communication paths 162 (e.g., wired and/or wireless connections) to each of the valves 112, 114, 126 and 132 of filter assembly section 110(1). For simplicity purposes, the communication paths 162 between the controller 160 and the various valves has only been shown for section 110(1). However, it is noted that the controller can be designed to control the valves of each filter assembly section.

In this embodiment, the controller can be programmed to perform a blowback cycle or process over a predetermined time interval for a particular filter assembly section. Alternatively, or in addition to performing the blowback process at each predetermined time interval, the controller can further be in communication with one or more suitable sensors disposed at suitable locations within the system so as to monitor the sample fluid flow rate through a particular filter assembly section and initiate a blowback process when the flow rate drops below a predetermined threshold value. The controller is further programmed to control the valves of another filter assembly section to facilitate a switching of sample fluid flow between two filter assembly sections when a blowback process is initiated, thus ensuring a substantially continuous flow of sample fluid from the sample probe to the analyzer section during the blowback process.

The isolation of individual filter assembly sections during the blowback process further protects the analyzer equipment in the analyzer section from high pressure and/or cleaning fluids and further reduces the overall system volume that is being treated with the blowback fluids at any given time.

Each filter assembly section in the system described above and depicted in FIG. 2 is connected to a manifold section 135 that leads to a single flow line 140. However, the system can be modified such that two or more filter assembly sections direct sample fluids to separate flow lines that lead to separate conditioning devices and/or separate analyzer sections.

Having described systems and corresponding methods for filtering particulate materials in continuous emission monitoring systems, it is believed that other modifications, variations and changes will be suggested to those skilled in the art in view of the teachings set forth herein. It is therefore to be understood that all such variations, modifications and changes are believed to fall within the scope of the appended claims.

The invention claimed is:

1. A method of monitoring fluid emissions from processing equipment, the method comprising:
    extracting a sample fluid from the processing equipment;
    delivering the sample fluid to a filter assembly comprising a plurality of filter assembly sections arranged in a parallel fluid flow manner with respect to each other, wherein each filter assembly section includes a filter unit and first and second valves disposed at upstream and downstream locations of the filter unit to isolate each filter assembly section from other portions of the filter assembly;
    selectively controlling the flow of the sample fluid through at least a first filter assembly section by opening the first and second valves of the first filter assembly section while preventing the sample fluid from flowing through at least a second filter assembly section by maintaining the first and second valves of the second filter assembly section in a closed position, wherein the filter unit of the first filter assembly section filters particulate materials from the sample fluid flowing through the first filter assembly section;
    delivering the filtered sample fluid from the filter assembly to an analyzer section that includes at least one analyzer to determine the concentration of at least one species within the filtered sample fluid;
    switching the flow of sample gas from the first filter assembly section to the second filter assembly section by closing the first and second valves of the first filter assembly section and opening the first and second valves of the second filter assembly section; and
    directing a filter cleaning fluid through the filter unit of the first filter assembly section in a direction that opposes a direction in which the sample fluid flows through the filter unit of the first filter assembly section.

2. The method of claim 1, wherein the sample fluid comprises a sample gas.

3. The method of claim 2, wherein the at least one analyzer of the analyzer section determines the concentration of at least one of $CO$, $CO_2$, $NO_x$, $O_2$ and $H_2$ in the sample gas.

4. The method of claim 1, wherein the flow of sample gas is switched from the first filter assembly section to the second filter assembly section when the flow rate of sample gas through the first filter assembly section drops below a threshold value.

5. The method of claim 1, wherein the flow of sample gas is switched from the first filter assembly section to the second filter assembly section is automatically switched via a controller.

6. The method of claim 1, wherein the filter unit of the first filter assembly section includes a hollow outer housing and a hollow inner filter member disposed within the outer housing, the filter unit is arranged within the first filter assembly section such that sample gas flowing through the first filter assembly section flows into an inlet of the outer housing, through portions of the inner filter member and out of an outlet of the inner filter member.

7. The method of claim 6, wherein the inner filter member comprises at least one of a sintered metal material and a sintered ceramic material.

8. The method of claim 6, wherein the directing of the filter cleaning fluid through the filter unit of the first filter assembly section comprises:
    delivering the filter cleaning fluid from a first fluid line directly into the outlet of the inner filter member and directly into the outer housing; and
    delivering the filter cleaning fluid from the inlet of the outer housing to a second fluid line so as to remove the filter cleaning fluid from the first filter assembly section.

9. The method of claim 2, wherein the sample gas is extracted from the processing equipment via a sample probe that is configured to operate in temperature range up to about 1500° C.

10. The method of claim 9, wherein the processing equipment from which the sample gas is extracted comprises an electric arc furnace.

11. The method of claim 2, further comprising:
    removing water from the filtered sample gas prior to delivery of the filtered sample gas to the analyzer section.

* * * * *